United States Patent [19]

Schreiber et al.

[11] B 3,996,186

[45] Dec. 7, 1976

[54] STORAGE-STABLE EPOXIDE MOULDING COMPOSITIONS

[75] Inventors: Bruno Schreiber, Basel; Hermann Diethelm, Aesch, both of Switzerland

[73] Assignee: Ciba-Geigy Corporation, Ardsley, N.Y.

[22] Filed: Dec. 7, 1973

[21] Appl. No.: 423,365

[44] Published under the second Trial Voluntary Protest Program on February 17, 1976 as document No. B 423,365.

[30] Foreign Application Priority Data

Dec. 14, 1972 Switzerland .................. 18262/72

[52] U.S. Cl. .................. 260/37 EP; 260/830 R
[51] Int. Cl.² .................. C08L 63/00; C08L 63/06
[58] Field of Search ......... 260/2 EP, 2 N, 77.5 NC, 260/830 TW, 2 EC, 37 EP, 830 R

[56] References Cited

UNITED STATES PATENTS

| | | | |
|---|---|---|---|
| 3,409,591 | 11/1968 | Landuo et al. .................. | 260/2 N |
| 3,459,713 | 8/1969 | Saran et al. .................. | 260/77.5 NC |
| 3,505,262 | 4/1970 | Freyhold et al. .................. | 260/2 EP |
| 3,538,184 | 11/1970 | Heer .................. | 260/830 TW |
| 3,625,918 | 12/1971 | Heer et al. .................. | 260/830 TW |
| 3,704,281 | 11/1972 | Saran et al. .................. | 260/77.5 NC |
| 3,810,785 | 5/1974 | Dominic et al. .................. | 260/2 EC X |

FOREIGN PATENTS OR APPLICATIONS 6,714,294   5/1968   Netherlands .................. 260/77.5 NC

OTHER PUBLICATIONS

*Chemical Abstracts,* por. 72:32700f, (Nov. 1969).

*Primary Examiner*—Donald E. Czaja
*Assistant Examiner*—S. M. Person
*Attorney, Agent, or Firm*—Vincent J. Cavalieri

[57] ABSTRACT

Storage-stable epoxide moulding compositions containing solid pre-adducts of triglycidyl isocyanurate and amine curing agents, fillers and release agents. After curing, these compositions form tracking-resistant plastics of high heat distortion point.

5 Claims, No Drawings

STORAGE-STABLE EPOXIDE MOULDING COMPOSITIONS

The invention relates to storage-stable epoxide moulding compositions which contain pre-adducts, which are solid at room temperature, of triglycidyl isocyanurate and amine curing agents, fillers and release agents and which, after curing, form tracking-resistant plastics of high heat distortion point.

Moulding compositions of epoxide resins based on (4,4-dihydroxy-diphenyl)-propane-2,2 or other bisphenols or polyphenols, which contain amines, acid anhydrides or aromatic polyhydroxy compounds (for example novolac resins) as curing agents, are distinguished by easy processability and very good properties of the mouldings and have therefore found a broad field of application.

However, their arcing resistance and tracking resistance is inadequate for some components (for example insulators) in the electrical industry. This shortcoming is attributable to the fact that at the temperatures prevailing under high current loads or in an electric arc, aromatic compounds are wholly or partially converted into electrically conducting graphite, which causes complete destruction of the material.

It is known in general to manufacture moulding compositions from liquid or fused epoxide resins, curing agents, fillers, release agents and other additives by mixing all these raw materials together in a mixing plant suitable for the purpose, and partially pre-reacting them. This method of manufacture can only be used in the case of those resin/curing combinations which are still sufficiently stable in the liquid state at the mixing temperature that they do not completely cure prematurely. However, if this method is applied to the manufacture of moulding compositions of a crystalline raw material which melts at a relatively high temperature, such as triglycidyl isocyanurate (hereafter referred to as TGIC), products of low storage stability and variable processing properties are obtained, which furthermore tend to exude on the surface of the mouldings.

It is also known to manufacture compositions of improved stability on storage by mixing solid epoxide resins, curing agents and fillers in ball mills or in mixing installations working on a similar principle. When using this method for TGIC moulding compositions, the viscosity of the binder is too low which leads to similar shortcomings to those already mentioned. To avoid this it is necessary to increase the viscosity of the binder by means of a prereaction with curing agents suitable for the purpose and thus at the same time to convert the crystalline TGIC into a state where, though it is solid and resinous at room temperature, it is easily fusible.

Various discontinuous processes for increasing the viscosity of TGIC have already been patented. They all consist of reacting a part of the glycidyl groups contained in the TGIC with reactive groups of a curing agent until the desired consistency is reached, without gelling taking place. This is possible either by using a curing agent which reacts slowly with TGIC, which, though used in sufficient amount for curing, permits the reaction to be stopped in time, for example by cooling, before the curing is complete, or by using a less than equivalent amount of curing agent, such that, whilst it suffices to convert TGIC into the resinous, solid state, it does not suffice for gelling. For the manufacture of TGIC moulding compositions it is above all these "(so-called) advancement processes" which are of interest, because they give pre-adducts which can then be combined with other curing agents in the moulding compositions.

All kinds of difficulties can arise in the (so-called) advancement of TGIC. TGIC is distinguished by extremely high reactivity, and the heat liberated can increase very rapidly and thus lead to complete decomposition of the raw material and, in the case of larger batches, even to an explosion. The hazard arises above all if the (so-called) advancement component is not mixed into the TGIC sufficiently rapidly and is too reactive, or if it dissolves too slowly in the fused TGIC.

When choosing the curing agent used for the (so-called) advancement, it is also necessary to pay attention to certain facts. Thus, non-aromatic curing agents are preferred because only in that case are moulding compositions free of aromatics obtained. Bifunctional curing agents are principally suitable for, the (so-called) advancement of a very reactive triepoxide such as TGIC, because in the case of polyfunctional compounds a very much less than equivalent amount must be used, and at the same time the tendency to gel increases. Seen from this point of view, non-aromatic dicarboxylic acids would be most suitable for the manufacture of the pre-adduct.

Various processes for the manufacture of pre-adducts from TGIC, or of moulding compositions based on this material, have already been described. For example, Swiss Patent Specification 451,508 and U.S. Pat. No. 3,459,713 propose converting TGIC by means of a less than equivalent amount of dicarboxylic acids or their anhydrides. Such a reaction can however only be carried out with very much less than the equivalent amount of anhydrides and is therefore rather more suitable for the manufacture of liquid and crystallisation-resistant pre-adducts. The manufacture of solid products, which demands a higher proportion of anhydride, is difficult to control and frequently leads to early gelling of the batch. The reaction with dicarboxylic acids shows better reproducibility. Here, however, a great disadvantage is the fact that the melting point of the dicarboxylic acids is in most cases high, or that their solubility in the fused TGIC is poor, with the two components reacting very rapidly - above all in the absence of solvents. This leads, in the case of larger batches, to the formation of cured, infusible constituents in the product. Furthermore, U.S. Pat. No. 3,459,713 states expressly that pre-adducts which have gelled and have been ground after cooling can also be used as curing agents.

German Auslegeschrift No. 1,694,868 describes the addition of monomeric TGIC to dihydric cycloaliphatic dihydroxy compounds.

It is also possible to pre-react TGIC with a less than equivalent amount of diamines. Aromatic amines which react slowly are suitable for this purpose, whilst with the substantially more reactive aliphatic or cycloaliphatic diamines the reaction takes place too vigorously. Furthermore, the manufacture of a solid pre-adduct from trifunctional TGIC and tetrafunctional curing agent is extremely difficult.

The subject of the invention are now new, storagestable epoxide moulding compositions which do not suffer from the abovementioned disadvantages. They are characterised in that they contain a. adducts, containing epoxide groups, with preferably at least 4 epoxide equivalents per kg, from triglycidyl isocyanurate and cycloaliphatic or aliphatic monoamines, b. adducts, containing amino groups, from cycloaliphatic or heterocyclic diamines and polyglycidyl compounds, as curing agents and c. inorganic or organic, pulverulent or fibrous fillers, with the resin and curing agent pre-adducts softening between 45° and 120°C, melting 5° − 30°C above the softening point and being present in the moulding compositions predominantly in the form of discrete particles.

The moulding compositions can contain further additives which are customary in, or can be used in, thermosetting moulding compositions, such as dyestuffs, plasticisers or flame-retarding agents. The compositions preferably contain lubricants.

The procedure followed, according to the invention, for the manufacture of the new products is to react triglycidyl isocyanurate containing at least 8 epoxide equivalents per kg with cycloaliphatic or aliphatic primary monoamines at temperatures between 50° and 200°C to give adducts a), containing epoxide groups, with at least 4 epoxide equivalents per kg, softening points between 45° and 120°C and melting points 5° to 30°C above the softening points, to react cycloaliphatic or heterocyclic diamines with polyglycidyl compounds to give adducts (b), containing amino groups and having softening points between 45° and 120°C and melting points 5° to 30°C above the softening points, and to mix the two adducts (a) and (b) with inorganic or organic pulverulent or fibrous fillers and to comminute the mixture, the resin and curing agent adduct particles being present predominantly in the form of mutually separate particles.

Preferably, the two adducts (a) and (b) are mixed with fillers and a lubricant.

Cyclohexylamine or alkyl homologues of cyclohexylamine, such as methylcyclohexylamine, ethylcyclohexylamine or isopropylcyclohexylamine, are preferentially used for the manufacture of the adducts (a).

The curing agent used is preferably a cycloaliphatic or heterocyclic diamine which has been (so-called) advanced with a diglycidyl compound. The moulding compositions are then manufactured in ball mills or equipment of similar operation, so that the resin and curing agent are present in the finished moulding composition predominantly as separate particles and thus ensure good storage stability of the product.

The TGIC containing epoxide groups, which has been (so-called) advanced with cyclohexylamine or its homologues is manufactured without or with solvents in a discontinuous or continuous process, with the (so-called) advancement reaction following the idealised scheme A. The (so-called) advancement can also advantageously be carried out in two stages. In the first stage, a curing agent is manufactured from an excess of cyclohexylamine and a less than equivalent amount of TGIC according to Scheme $B_1$ and in the second stage the TGIC is (so-called) advanced with the curing agent thus obtained, in accordance with the idealised scheme $B_2$.

In spite of the important differences between the idealised structures of the resin pre-adducts A and $B_2$, these products are very similar in their physical properties which also indicate a similar chemical structure.

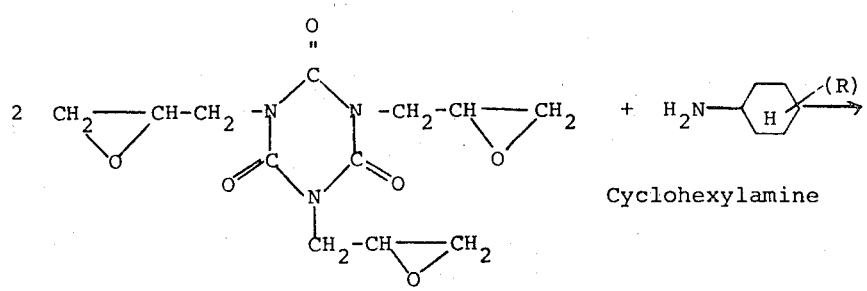

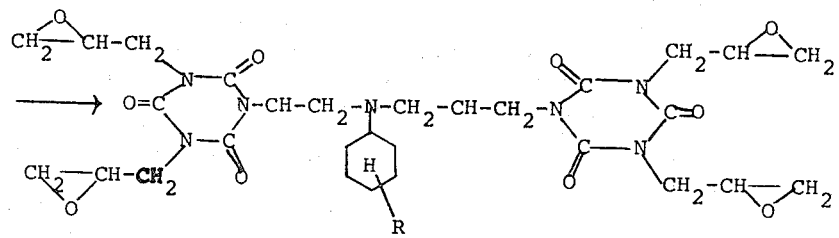

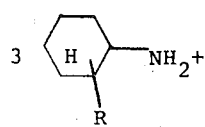
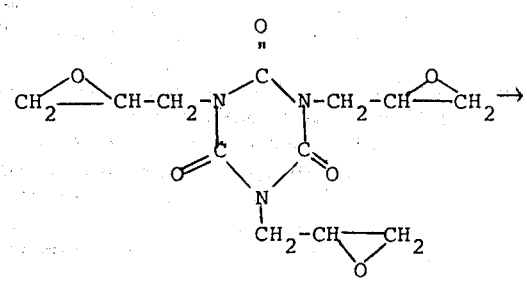

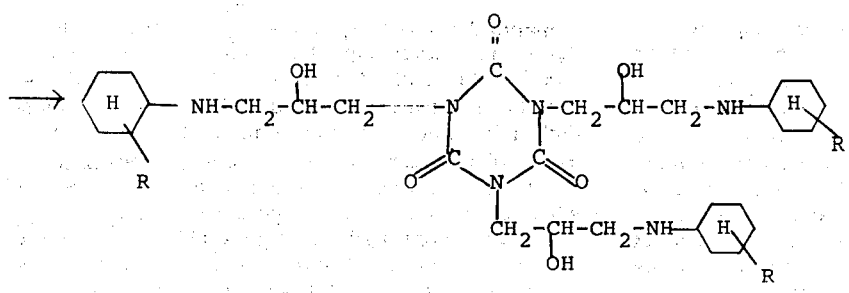

Cyclohexylamine pre-adduct B₁

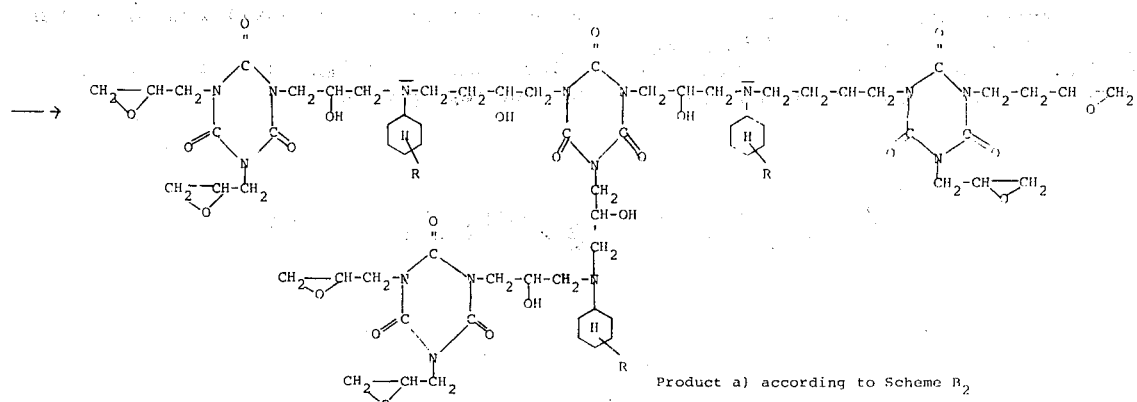

Product a) according to Scheme B₂

R = H, alkyl or cycloalkyl

The manufacture of the resin adduct a) according to Scheme A is carried out in the reaction vessel at temperatures between 80° and 200°C, preferably between 120° and 170°C. The quantities used are so chosen that 5 to 8 — preferably 5.5 to 7 — epoxide groups in the TGIC are present per one amino group in the cyclohexylamine. The influence of the ratio of the two components on the product can be seen from Example A.

The preferred procedure is as follows: TGIC is initially introduced into the reaction vessel and fused or mixed with the solvent, and cyclohexylamine is added dropwise over the course of 30 to 60 hours, with constant stirring, in such a way that the reaction always remains controllable and the temperature does not exceed 200°C — preferably 170°C. A viscous liquid results, which after cooling or removal of the solvent solidifies to give a solid resin.

During this reaction, heat is generated, which must be removed. In this respect, the two-stage method according to Schemes B₁ and B₂ shows advantages over the direct (so-called) advancement.

In the embodiment according to B₁, the procedure adopted is usually as follows: Cyclohexylamine or an alkyl homologue thereof is introduced into the reaction vessel and warmed to the boil, and fused TGIC in less than equivalent amount is added dropwise whilst stirring constantly, and is mixed in. The ratio of the two raw materials is so chosen that there are 0.7 – 1.5 epoxide groups, preferably 0.9 to 1.2 epoxide groups, per one amino group in the cyclohexylamine. After completion of the addition, the resulting melt is warmed for a further 15 minutes and is then cooled. The resulting curing agent B₁ is used for the (so-called) advancement of TGIC according to reaction Scheme B₂.

Even the first experiments on (so-called) advancing the TGIC with the cyclohexylamine/TGIC adduct curing agent showed, surprisingly, that very little heat is liberated during this reaction. Even if the two raw materials are fused at 130° – 140°C and are then mixed together all at once in the appropriate ratio, the temperature of the mixture only rises by 15° – 20°C over a short time if a 5 kg quantity is used. After cooling the melt of the product B₂, a resin similar to that according to Scheme A, which is suitable for the manufacture of the moulding compositions, is obtained.

The melting point of the adduct and its melt viscosity can be varied extensively by changing the amount of curing agent used.

The advantageous course of the reaction during the direct (so-called) advancement according to Scheme A can be explained through the addition of the first amino hydrogen in the cyclohexylamine to the epoxide groups taking place very rapidly, whilst the reaction of the resulting secondary amine is substantially slower.

The conditions during reaction B₂ are similarly favourable. The secondary amino groups which predominate in the curing agent pre-adduct according to Scheme B₁ admittedly react rapidly enough, but with little exothermic effect. In view of this fact, it was found that it is even possible to carry out this (so-called) advancement continuously.

Technical or pure triglycidyl isocyanurate and the ground curing agent pre-adduct according to B₁ are premixed in a mixing device (ball mill and the like) in a weight ratio such that the total proportion of TGIC and cyclohexylamine in the mixture corresponds to a molar ratio of about 2:1. The resulting pre-mix is then fused and mixed on a mixing device which is warmed to a temperature of 100° – 200°C and operates continuously (for example a co-kneader, extruder and the like). As a result of the (so-called) advancement reaction which hereupon takes place, the solid and resinous adduct a) according to $B_2$ is obtained after cooling the melt, and this adduct, similarly to the TGIC adduct according to A, is used for the manufacture of the moulding composition. The solid amine curing agent pre-adducts required as curing agents for the moulding composition are manufactured from a) cycloaliphatic diamines, such as 1,2-, 1,3- and 1,4-diaminocyclohexane, 4,4'-diamino-dicyclohexyl-methane, (4,4'-diamino-dicyclohexyl)-propane-(2,2), (4,4'-diamino-3,3'-dimethyl-dicyclohexyl)-methane and other diaminodicyclohexylalkanes in addition to their homologues, or from 3-aminomethyl-3,5,5-trimethyl-cyclohexylamine, or from heterocyclic diamines, and from (b) a less than equivalent amount of a diglycidyl compound, such as bisphenol-A epoxide resins, diglycidyl esters of cycloaliphatic, heterocyclic or aromatic dicarboxylic acids, for example 1,2-, 1,3- and 1,4-cyclohexanedicarboxylic acid, N,N'-cyclohexylamine-diglycid or other diglycidyl compounds, which with an excess of diamines, at reaction temperatures of up to 200°C, give curing agents containing amino groups which are solid at room temperature but are fusible.

The curing agent adduct is preferably manufactured in the presence of solvents in the reaction vessel at temperatures between 50° and 200°C, preferably between 120° and 170°C, by first introducing the amino compound and mixing in the diglycidyl compound in portions or continuously; alternatively, the two components are continuously mixed, and reacted, in a suitable reactor for the purpose which is heated to 200°C, the reaction taking place almost quantitatively under these conditions and giving products of good storage stability.

The reaction takes place approximately according to the following equation:

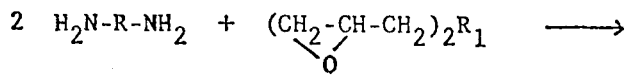

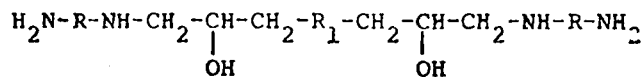

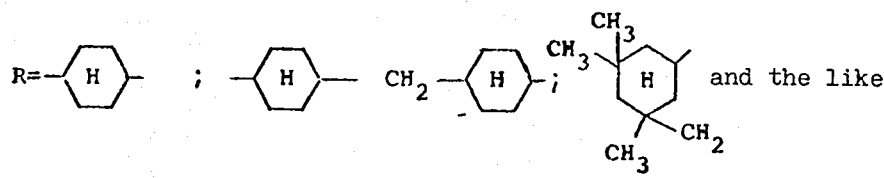

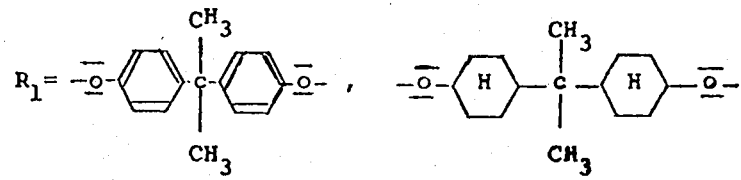

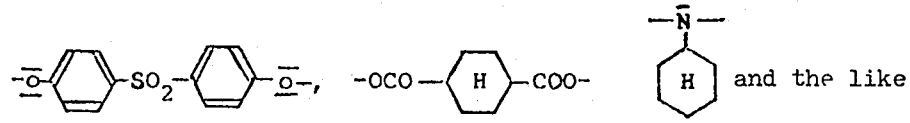

The ratio of amino groups to epoxide groups in the batch lies in the range from 1.5 to 3.0, preferably from 1.75 to 2.50, and accordingly yields adducts with melting points of 50° to 150°C.

The moulding compositions can be manufactured as follows:

Approximately equivalent amounts of triglycidyl isocyanurate and polyamine pre-adducts are mixed with inorganic or organic, pulverulent or fibrous fillers, lubricants, pigments and other constituents of the moulding composition in a ball mill or in a device of similar operation which permits comminution and mixing of the moulding composition without more than superficial sintering-together of the resin particles and curing agent particles taking place during this mixing and comminution process. Thus, the resin and curing agent are predominantly present as separate particles in the finished moulding composition; they only react on melting in the press or screw injection moulding machine used for their processing. Finally, the resulting powder is granulated and converted further.

It is also possible to manufacture the moulding composition with an excess, or less than equivalent amount, of curing agent pre-adduct and thereby to vary the properties of the moulding compositions within a certain range. Furthermore, the triglycidyl isocyanurate and amine curing agent pre-adducts used can also be modified with other epoxide, polyester, polyurethane, silicone and other synthetic resins, such resins being solid at room temperature, and different polyamine curing agent adducts can be combined with one another, these adducts only being mixed in on the mixing device or being dissolved in the resin or curing agent adducts. By these means it is possible, for example, to plasticise the products or to improve other properties. Fillers which can be used are kaolin, quartz powder, slate powder, chamotted kaolin, mica, wollastonite, diopside, dolomite, talc, barium sulphate, hydrated aluminium oxide, asbestos, antimony trioxide and the like, as well as pigments and substances which simultaneously increase the strength or the stiffness, such as glass fibres, boron fibres and carbon fibres, cellulose, polyamide, polyester, polyacrylonitrile and other inorganic or organic fibres. Any combinations of such fillers can also be employed.

Lubricants used are stearates, such as zinc stearate, calcium stearate, magnesium stearate, aluminium stearate or tin stearate, and also paraffin, stearin, beeswax, carnauba wax, montan wax and synthetic waxes based on polyethylene or silicone, and the like.

All products manufactured according to this process, above all the systems cured with amine pre-adducts which are free of aromatics, are distinguished by very high tracking resistance (KA 3 c) and arcing resistance (over 185 seconds according to ASTM).

As compared to the amine-cured products based on the so-called B-stage principle — according to Swiss Pat. No. 459,563— the TGIC moulding compositions according to the invention have substantially better storage stability at room temperature but nevertheless cure rapidly during processing. A further advantage over the B-stage moulding compositions is the excellent surface of the mouldings without any tendency to exudations, which can be ascribed to the absence of crystalline constituents, which are of low viscosity after fusing. These moulding compositions are furthermore characterised by a high heat distortion point and a low water absorption, above all even in boiling water.

MANUFACTURE OF THE RESIN

Resin adducts $A_1$, $A_2$ and $A_3$ 1,000 g of triglycidyl isocyanurate containing 9.3 epoxide equivalents/kg are first introduced into a 2 liter reaction vessel and warmed to 130°C in an oil bath. 130 g of cyclohexylamine containing 10.1 amino equivalents/kg are added dropwise and mixed in, with constant stirring, over the course of 30 minutes in such a way that the temperature of the mixture does not rise above 150°C. After a further 30 minutes at the same temperature the resulting viscous liquid is cooled and the resinous, colourless and brittle resin is ground.

Products with 150 and 170 g of cyclohexylamine are prepared similarly:

| Mixture | | $A_1$ | $A_2$ | $A_3$ |
|---|---|---|---|---|
| Amounts taken | TGIC | 1,000 g | 1,000 g | 1,000 g |
| | Cyclohexylamine | 130 g | 150 g | 170 g |
| Properties of the products | | | | |
| Epoxide group equivalents/kg | | 5.9 | 5.5 | 5.1 |
| Kofler softening point, °C | | 48 | 60 | 65 |
| Kofler melting point, °C | | 63 | 77 | 83 |

Resin adduct B 1,000 g of technical triglycidyl isocyanurate with 9.4 epoxide equivalents/kg are premixed with 160 g of cyclohexylamine (10.1 $NH_2$/kg) in a 5 liter twin bowl kneader and fused together in a laboratory co-kneader at 150°C. The melt issuing from the apparatus is cooled and ground.

Properties of the product:

| Epoxide equivalents/kg | 5.4 |
|---|---|
| Kofler softening point | 62°C |
| Kofler melting point | 78°C |

Resin adduct C 841 g of triglycidyl isocyanurate are fused in a 2 liter beaker and 309 g of finely ground curing adduct C are added all at once, at 125°C, with vigorous stirring. The temperature first drops to 85°C and then rapidly rises to 135°C as a result of the exothermic reaction. After a further 10 minutes the product is cooled and comminuted.

Properties of the product:

| Epoxide equivalents/kg | 5.0 |
|---|---|
| Kofler softening point | 69°C |
| Kofler melting point | 79°C. |

Resin adduct D a. 992 g of cyclohexylamine (10.1 $NH_2$/kg) are warmed to 120° – 125°C in a 3 liter stirred vessel with reflux condenser. 1,052 g of fused triglycidyl isocyanurate (9.5 epoxide equivalents/kg) are added dropwise over the course of 45 minutes from a heated dropping funnel. The speed of addition is regulated in such a way that the temperature of the reaction mixture does not rise above 170°C. After a further 15 minutes at 130° – 140°C, the viscous product is cooled and ground.

Properties of the product:

| Amine equivalents/kg | 4.9 |
|---|---|
| Kofler softening point | 72°C |
| Kofler melting point | 82°C. | b. 735 g of this product and 2,000 g of triglycidyl isocyanurate (9.4 epoxide equivalents/kg), both raw materials having been ground to a particle size of less than 2 mm are thoroughly mixed for 10 minutes in a twin bowl kneader. The resulting mixture is mixed together and allowed to react in a laboratory extruder warmed to 160°C. The resulting resin adduct is ground after cooling.

Properties of the product:

| Epoxide equivalents/kg | 5.2 |
|---|---|
| Kofler softening point | 66°C |
| Kofler melting point | 78°C. |

Resin adduct E 500 g of triglycidyl isocyanurate (9.4 epoxide equivalents/kg) are initially introduced into a 2 liter reaction vessel and warmed to 130°C. 86 g of 2-methylcyclohexylamine (8.8 amine equivalents/kg) are added dropwise over the course of 30 minutes and mixed. After warming to 130°C for a further 30 minutes, the resulting melt is cooled and the product is ground.

Properties of the product:

| Epoxide equivalents/kg | 5.35 |
|---|---|
| Kofler softening point | 58°C |
| Kofler melting point | 75°C. |

Resin adduct F 1,000 g of triglycidyl isocyanurate containing 9.3 epoxide equivalents/kg are initially introduced into a 2 liter reaction vessel and fused. After adding 100 g of methyl ethyl ketone, 155 g of cyclohexylamine are mixed into the solution at 80°C over the course of 30 minutes, with constant stirring. The temperature is then raised to 130°C over the course of 1 hour in vacuo (30 mm Hg) and the solvent is removed. The product is ground after cooling.

Properties of the product:

| Epoxide equivalents/kg | 5.4 |
|---|---|
| Kofler softening point | 61°C |
| Kofler melting point | 77°C. |

MANUFACTURE OF THE CURING AGENTS

Curing agent I 477 g of 4,4'-diamino-3,3'-dimethyl-dicyclohexylmethane (8.4 amino equivalents/kg) are initially introduced into a 1 liter reaction vessel and warmed to 130°C. 284 g of diglycidyl ester of 1,2-cyclohexanedicarboxylic acid are mixed in over the course of 30 minutes and the mixture is warmed for a further 30 minutes. It is then cooled and the solid product is ground.

Properties of the product:

| Amino group equivalents/kg | 5.94 |
|---|---|
| Kofler softening point | 60°C |
| Kofler melting point | 73°C. |

Curing agent II 420.7 g of 4,4'-diamino-dicyclohexylmethane (9.5 amino equivalents/kg) are mixed in a 1 liter reaction vessel with 374.5 g of bisphenol A epoxide resin (5.3 epoxide equivalents/kg) and the mixture is warmed to 130°C over the course of 1 hour. After warming for a further hour, the viscous product is cooled and powdered.

Properties of the product:

| Amino group equivalents/kg | 3.71 |
|---|---|
| Kofler softening point | 66°C |
| Kofler melting point | 78°C |

Curing agent III 545 g of 4,4'-diamino-3,3'-dimethyl-dicyclohexylmethane are initially introduced into a 2 liter reaction vessel and warmed to 130°C. 450 g of bisphenol A epoxide resin are added dropwise, and mixed in, over the course of 40 minutes. The mixture is then kept at the same temperature for a further 20 minutes. The product is then cooled and ground.

Properties of the product:

| Amino group equivalents/kg | 4.17 |
|---|---|
| Kofler softening point | 65°C |
| Kofler melting point | 78°C. |

Curing agent IV 1,142 g of 1,2-diamino-cyclohexane (17.4 amino equivalents/kg) are premixed with 1,170 g of N,N-diglycidylcyclohexylamine (8.7 epoxide equivalents/kg) at room temperature and fed into a co-kneader warmed to 150°C and the solid product obtained after cooling is powdered.

Properties of the product:

| Amino group equivalents/kg | 6.50 |
|---|---|
| Kofler softening point | 65°C |
| Kofler melting point | 79°C |

Curing agent V 920 g of 4,4'-diamino-3,3'-dimethyl-cyclohexylmethane are initially introduced into a 2 liter reaction vessel and warmed to 130°C. 300 g of triglycidyl isocyanurate (9.3 epoxide equivalents/kg) in the fused form (120°C) are then added dropwise, and mixed in, over the course of 45 minutes. The product obtained after cooling is powdered.

Properties of the product:

| Amino group equivalents/kg | 8.9 |
|---|---|
| Kofler softening point | 55°C |
| Kofler melting point | 70°C |

Curing agent VI 340.6 g (2 mols) of 3-aminomethyl-3,5,5-trimethylcyclohexylamine are warmed to 120°C in a 1 liter reaction vessel. 377.3 g of bisphenol A epoxide resin (5.3-epoxide equivalents/kg) are added dropwise, and mixed in, over the course of 30 minutes, with constant stirring. The resulting product, which is solid after cooling, is powdered.

Properties of the product:

| Amino group equivalents/kg | 4.18 |
|---|---|
| Kofler softening point | 63°C |
| Kofler melting point | 78°C. |

Curing agent VII 228.4 g of 1,2-diamino-cyclohexane are initially introduced into a 1 liter reaction vessel. 375 g of bisphenol A epoxide resin (5.34 epoxide group equivalents/kg) are added dropwise, and mixed in, over the course of 30 minutes at 130°C. After warming for an additional 30 minutes, the product is cooled and powdered.

Properties of the product:

| | |
|---|---|
| Amino group equivalents/kg | 4.97 |
| Kofler softening point | 62°C |
| Kofler melting point | 78°C |

Curing agent VIII 258.4 g of N-aminoethylpiperazine are warmed to 120°C in a 1 liter reaction vessel. 395 g of bisphenol A epoxide resin (epoxide equivalents/kg = 5.30) are added dropwise, and mixed in, over the course of 45 minutes, with constant stirring. The solid product obtained after warming to 130°C for a further 30 minutes and then cooling is ground.

Properties of the product:

| | |
|---|---|
| Amino group equivalents/kg | 4.4 |
| Kofler softening point | 51°C |
| Kofler melting point | 62°C |

Curing agent IX 340 g of 2,3-dimethyl-3-aminopropyl-piperidine are warmed to 130°C in a 1 liter reaction vessel. 390 g of bisphenol A epoxide resin (5.35 epoxide equivalents/kg) are added dropwise, and mixed in, over the course of 45 minutes at this temperature, with constant stirring. The solid product obtained after warming to 130°C for a further 30 minutes is ground.

Properties of the product:

| | |
|---|---|
| Amino group equivalents/kg | 2.8 |
| Kofler softening point | 55°C |
| Kofler melting point | 68°C. |

EXAMPLES

Moulding composition 1

147 g of resin adduct $A_2$, 113 g of curing agent III, 542 g of Wollastonite, 190 g of aluminium oxide trihydrate, 7 g of polyethylene wax and 3 g of gas black are ground for 10 hours in a 4.5 liter ball mill.

The resulting finely powdered moulding composition is granulated and tabletted and the tablets, prewarmed to 80°C, are moulded in press tools warmed to 160°C. The following properties are measured on the test specimens:

| | |
|---|---|
| Flexural strength (DIN), kp/cm$^2$ | 1,020 |
| Impact strength (DIN), cmkp/cm$^2$ | 9 |
| Martens heat distortion point, °C | 182 |
| Water absorption (DIN), mg | 8 |
| Tracking resistance | KA 3c |
| Electrical volume resistance, Ohm.cm | $8.10^{14}$ |

Moulding composition 2

220 g of resin adduct D, 80 g of curing agent V, 500 g of aluminium oxide trihydrate, 180 g of chamotted kaolin, 5 g of carnauba wax and 5 g of black iron oxide are ground for 10 hours in a 4.5 liter ball mill.

The resulting powder is granulated and moulded like moulding composition 1.

The properties of this moulding composition were compared with those produced from the TGIC preadducts (so-called) advanced with dicarboxylic acids.

| Moulding composition | 2 | X | Y | Z |
|---|---|---|---|---|
| Epoxide equivalents/kg | 5.2 | 4.70 | 6.2 | 4.6 |
| Softening point, °C | 66 | 74 | <50 | 68 |
| Melting point, °C | 78 | 86 | 60 | 82 |
| Flexural strength | 900 | 720 | 805 | 890 |
| Impact strength | 7.1 | 8.0 | 6.5 | 7.7 |
| Heat distortion point | 170 | 130 | 139 | 158 |
| Tracking resistance | KA 3c | KA 3c | KA 3c | KA 3c |
| Water absorption in % (24 hours in H$_2$O, at RT) | 0.07 | 0.08 | 0.09 | 0.08 |
| Boiling water absorption in % (10'/97°C) | 0.08 | 0.15 | 0.11 | 0.18 |

Manufacture of the adducts from triglycidyl isocyanurate and dicarboxylic acids:

2 mols of triglycidyl isocyanurate are fused in a reaction vessel at 150° – 175°C. 1 mol of dicarboxylic acid is added in portions over the course of 60 minutes. After warming for a further 30 minutes, the resulting melt is cooled and ground. The resin adducts are cured with curing agent V in the same manner as described under moulding composition 2. Equivalent amounts of resin adduct and curing agent V are used.

The moulding composition from the triglycidyl preadduct with isophthalic acid is designated X in the table, that with terephthalic acid is designated Y and that with hexahydrophthalic acid is designated Z.

Moulding composition 3

180 g of resin adduct D, 120 g of curing agent VI, 500 g of aluminium oxide trihydrate, 193 g of kaoline, 2 g of polyethylene wax, 3 g of carnauba wax and 2 g of red iron oxide are mixed and ground in a 4.5 liter ball mill for 15 hours. The further treatment of the product obtained is as for moulding composition 1.

Properties of the product:

| | |
|---|---|
| Flexural strength (DIN), kp/cm$^2$ | 780 |
| Impact strength (DIN), cmkp/cm$^2$ | 7.0 |
| Martens heat distortion point, °C | 170 |
| Water absorption (DIN), mg | 9 |
| Tracking resistance | KA 3c |
| Electrical volume resistance, Ohm.cm | $5.10^{14}$ |

Moulding composition 4

206 g of resin adduct C, 94 g of curing agent IV, 500 g of quartz powder, 190 g of kaolin, 5 g of polyethylene wax and 5 g of gas black are mixed and ground in a 4.5 liter ball mill for 6 hours. The further treatment of the product is as for moulding composition 1.

Properties of the product:

| | |
|---|---|
| Flexural strength (DIN), kp/cm$^2$ | 1,170 |
| Impact strength (DIN), cmkp/cm$^2$ | 11.0 |
| Martens heat distortion point, °C | 179 |
| Water absorption (DIN), mg | 7 |
| Tracking resistance | KA 3c |
| Electrical volume resistance, Ohm.cm | $1.10^{15}$ |

Moulding composition 5

206 g of resin adduct B, 94 g of curing agent adduct I, 390 g of powdered diopside, 300 g of ground glass fibres and 1 g of calcium stearate are ground for 7 hours in a 4.5 liter ball mill, and the resulting powder is treated further as for moulding compositon 1.

Properties of the product:

Moulding composition 6

| | |
|---|---|
| Flexural strength (DIN), kp/cm$^2$ | 1,300 |
| Impact strength (DIN), cmkp/cm$^2$ | 12 |
| Martens heat distortion point, °C | 190 |
| Water absorption (DIN), mg | 6 |
| Tracking resistance | KA 3c |
| Electrical volume resistance, Ohm.cm | $9.10^{14}$ |

18.6 g of resin adduct E, 11.4 g of curing agent adduct VIII, 685 g of quartz powder, 10 g of calcium stearate and 5 g of gas black are ground for 6 hours in a 4.5 liter ball mill and the resulting moulding composition is further treated as for moulding composition 1. Properties of the product:

| | |
|---|---|
| Flexural strength (DIN), kp/cm$^2$ | 1,150 |
| Impact strength (DIN), cmkp/cm$^2$ | 9 |
| Martens heat distortion point, °C | 152 |
| Water absorption (DIN), mg | 17 |
| Tracking resistance | KA 3c |
| Electrical volume resistance, Ohm.cm | $5.10^{15}$ |

What we claim is:

1. Storage-stable, rapidly curing epoxide moulding compositions, characterised in that they contain
   a. adducts, containing epoxide groups, from triglycidyl isocyanurate and cyclohexylamine or alkyl substituted cyclohexylamine,
   b. adducts, containing amino groups, from cycloaliphatic or heterocyclic diamines and diglycidyl compounds, as curing agents and
   c. inorganic or organic, pulverulent or fibrous fillers with the resin and curing agent pre-adducts softening between 45° and 120°C, melting 5° – 30°C above the softening point and being present in the moulding compositions predominantly in the form of discrete particles wherein components (a) and (b) are present in about equivalent amounts.

2. Epoxide moulding compositions according to claim 1, characterised in that they also contain lubricants.

3. Epoxide moulding compositions according to claim 1, characterised in that the adducts containing epoxide groups possess at least 4 epoxide equivalents per kg of resin.

4. Epoxide moulding compositions according to claim 1, characterised in that they contain adducts of cycloaliphatic diamines and diglycidyl compounds as curing agents.

5. Epoxide moulding compositions according to claim 1 characterized in that said alkyl substituted cyclohexylamine is selected from the group consisting of methylcyclohexylamine, ethylcyclohexylamine or isopropylcyclohexylamine.

* * * * *